(12) United States Patent
Chou

(10) Patent No.: US 8,854,749 B2
(45) Date of Patent: Oct. 7, 2014

(54) VOICE COIL MOTOR HAVING A BASE WITH PROTRUSIONS AND A SHELL WITH MOUNTING HOLES RECEIVING THE PROTRUSIONS

(75) Inventor: Tai-Hsu Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 206 days.

(21) Appl. No.: 13/533,079

(22) Filed: Jun. 26, 2012

(65) Prior Publication Data

US 2013/0242420 A1    Sep. 19, 2013

(30) Foreign Application Priority Data

Mar. 15, 2012  (TW) .............................. 101108965 A

(51) Int. Cl.
    *G02B 7/02* (2006.01)
(52) U.S. Cl.
    USPC ........................................................ 359/824
(58) Field of Classification Search
    USPC ........................................................ 359/824
    See application file for complete search history.

(56) References Cited

U.S. PATENT DOCUMENTS 8,634,150 B2 *  1/2014  Chou .............................. 359/824

* cited by examiner

*Primary Examiner* — Jack Dinh
(74) *Attorney, Agent, or Firm* — Novak Druce Connolly Bove + Quigg LLP

(57) ABSTRACT

A voice coil motor includes a base made of plastic or resin, a stator, a moving and a shell. The base includes a mounting surface, assembling surfaces, and protrusions extending from at least one of the assembling surfaces. The stator includes a rack and magnets. The rack is mounted to the mounting surface. The moving unit received in the rack. The shell includes a top plate and side plates extending from the top plate. The shell defines at least one slot. Each slot is positioned at a joint between two neighboring side plates. At least one side plate defines mounting holes. The base, the moving unit, and the stator are accommodated in the shell. Each protrusion passes through a mounting hole and is heated to form a head portion. The head portion is positioned outside the shell and has an outer diameter greater than a diameter of each mounting hole.

12 Claims, 4 Drawing Sheets

VOICE COIL MOTOR HAVING A BASE WITH PROTRUSIONS AND A SHELL WITH MOUNTING HOLES RECEIVING THE PROTRUSIONS

BACKGROUND

1. Technical Field

The present disclosure relates to voice coil motors, and particularly to a voice coil motor having firm structure.

2. Description of Related Art

Voice coil motors (VCMs) can be used as means of focusing in camera modules. A VCM usually includes a shell, a moving unit, a rack, and a base. The shell is made of electrically conductive materials and includes a plurality of continuous side plates to provide electro magnetic interference (EMI) shielding for the VCM. In assembling, the rack equipped with magnets is mounted to the base. The moving unit is movably received in the rack and is wound with coils. The base, the rack, and the moving unit are accommodated in the shell. The side plates sleeve outside the base such that the base can be clamped in the side plates. In use, when applying current to the coils, magnetic driving forces between the magnets and the coils are generated, therefore a lens can be held in the moving unit and driven to move along with the moving unit for focusing. However, if the size of base is slightly less than the designed size, it will result in the side plates not being clamped securely to the base, or when the size of base is slightly greater than the designed size, it will result in the side plates deforming.

Therefore, it is desirable to provide a voice coil motor and a manufacturing method for the voice coil motor which can overcome the above-mentioned problems.

DETAILED DESCRIPTION

Figure 1:
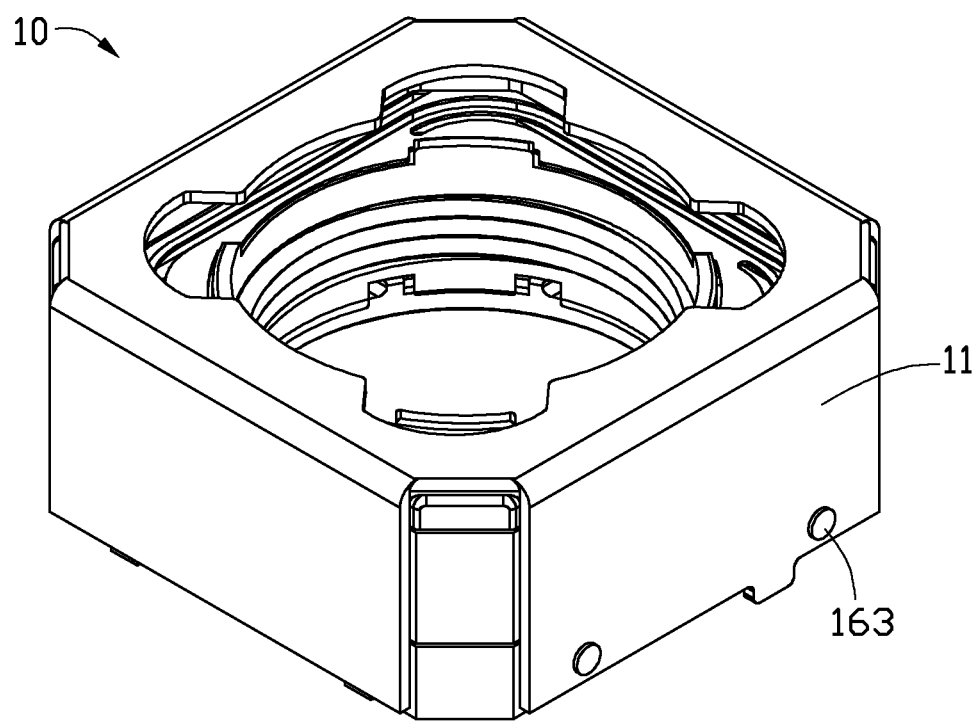
FIG. 1 is a fully assembled view of a voice coil motor in accordance with an exemplary embodiment.
Figure 2:
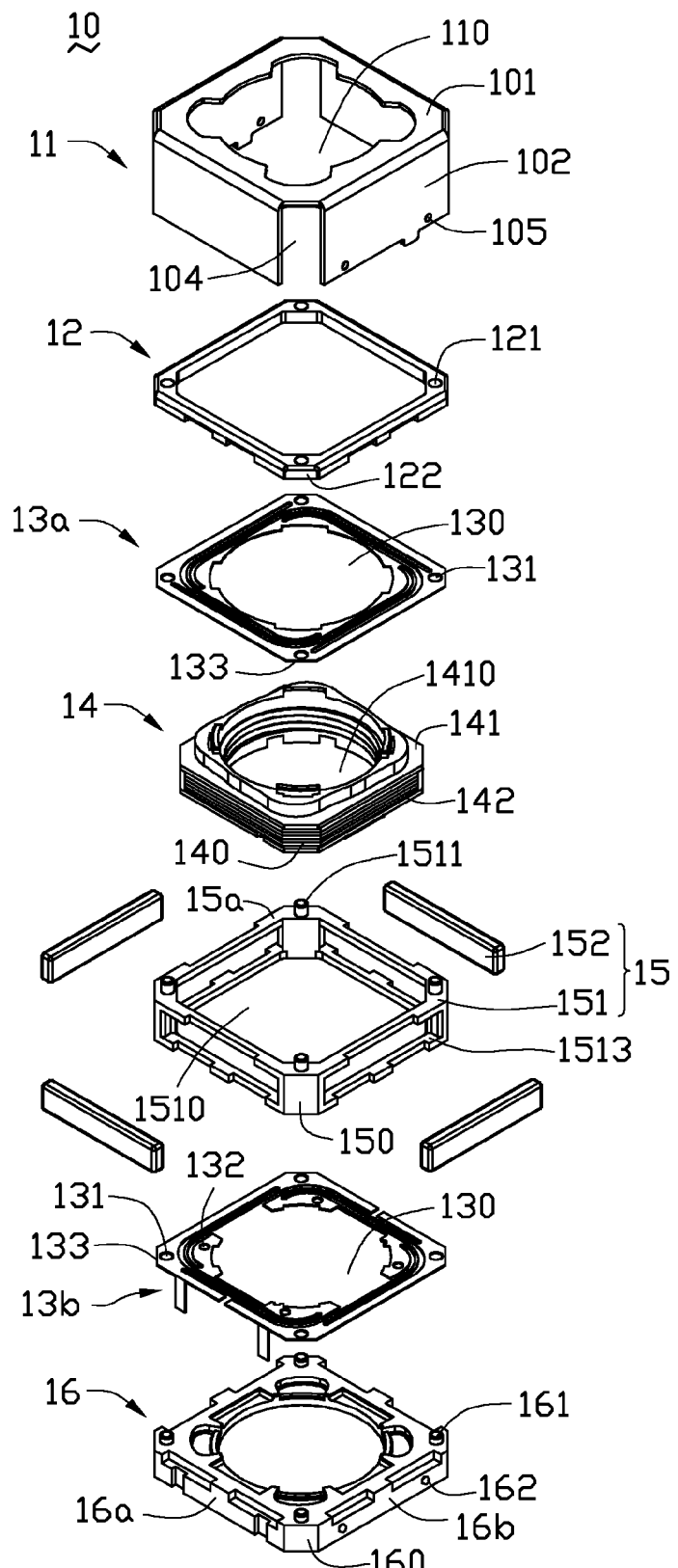
FIG. 2 is an exploded view of the voice coil motor of FIG. 1.

FIGS. 1 and 2 illustrate a VCM 10 in accordance with an exemplary embodiment. The VCM 10 includes a shell 11, a frame 12, an upper elastic sheet 13a, a lower elastic sheet 13b, a moving unit 14, a stator 15, and a base 16.

The shell 11 is made of electrically conductive materials, such as a conductive alloy, a conductive polymer, or conductive glass, which provides electro EMI shielding for the VCM 10. In this embodiment, the shell 11 is made of ferronickel alloy. The shell 11 includes a top plate 101 and a plurality of side plates 102 perpendicularly extending from the periphery of the top plate 101. In this embodiment, the top plate 101 is substantially square and defines a through hole 110 generally at the center. The shell 11 includes two pairs of side plates 102. Each of the side plates 102 extends from a corresponding side of the top plate 101.

The top plate 101 and the four side plates 102 cooperatively define a receiving room (not labeled) for receiving the frame 12, the upper elastic sheet 13a, the lower elastic sheet 13b, the moving unit 14, the stator 15, and the base 16. A joint between each two adjacent side plates 102 is slotted, forming a slot 104. As such, the shell 11 is deformable when any of the side plates 102 is pressed. One pair of the side plates 102 define a plurality of mounting holes 105. In this embodiment, each one of the pair of the side plates 102 defines two mounting holes 105 positioned far from the top plate 101.

The frame 12 is substantially a square frame, corresponding to the top plate 101 in shape. The frame 12 is made of plastic and defines four upper alignment holes 121. Each of the upper alignment holes 121 is generally defined at a corner of the frame 12 and passes through the frame 12. Each of four corners of the outer periphery of the frame 12 is chamfered, forming a first chamfered surface 122.

The upper elastic sheet 13a is stamped from a metal sheet, which has a shape of substantially a rectangular frame. The upper elastic sheet 13a defines a light passing hole 130 substantially at the center and four first alignment holes 131 generally at four corners of the upper elastic sheet 13a.

The lower elastic sheet 13b is also stamped from a metal sheet, which also has a shape of substantially a rectangular frame. The lower elastic sheet 13b defines a light passing hole 130 generally at the center, four first alignment holes 131, and four second alignment holes 132. Each of the first alignment holes 131 and the second alignment holes 132 is defined substantially at a corner of four corners of the lower elastic sheet 13a.

Each of the four corners of the outer periphery of the upper elastic sheet 13a and the lower elastic sheet 13b is chamfered, forming a second chamfered surface 133.

The moving unit 14 includes a lens retainer 141 and coils 142 wrapped around the lens retainer 141. The lens retainer 141 defines a circular hole 1410 passing through two end surfaces for receiving a lens (not show). The lens retainer 141 is generally cuboid and each of four corners of the lens retainer 141 is chamfered, forming a third chamfered surface 140.

Figure 3:
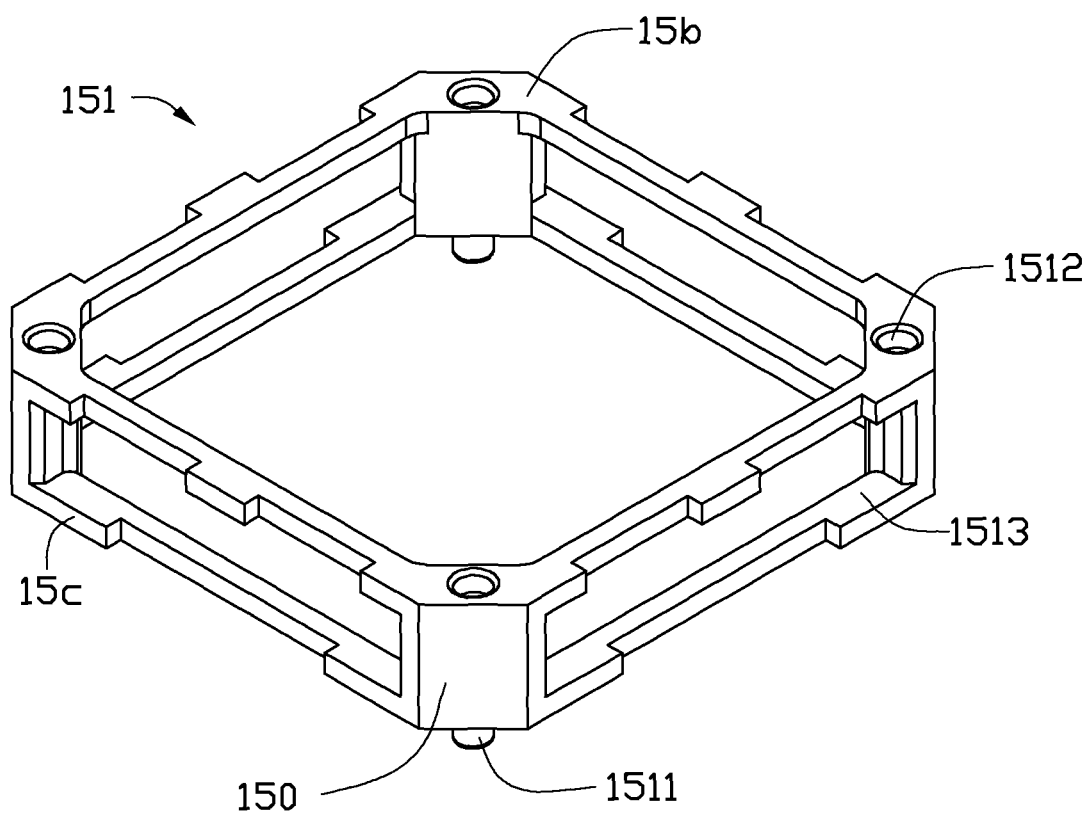
FIG. 3 is an isometric view of a rack of the voice coil motor of FIG. 2.

Referring to FIGS. 2 and 3, the stator 15 includes a rack 151 and four magnets 152. The rack 151 is substantially cuboid and includes a top surface 151a, a bottom surface 151b opposite to the top surface 151a, and four sidewalls 151c. The top surface 151a and the bottom surface 151b are generally square. The rack 151 further includes four upper alignment poles 1511 extending from the top surface 151a. Each upper alignment pole 1511 spatially corresponds to an upper alignment hole 121 of the frame 12 and a first alignment hole 131 of the upper elastic sheet 13a. The four sidewalls 151 perpendicularly connect between the top surface 151 a and the bottom surfaces 151b. The rack 151 defines a receiving space 1510, four lower alignment holes 1512, and four accommodating holes 1513. The receiving space 1510 is defined through the top surface 151a and the bottom surface 151b and is surrounded by the four sidewalls 15c. The receiving space 1510 is configured to receive the moving unit 14. The four lower alignment holes 1512 are generally defined at four corners of the bottom surface 151b. Each accommodating hole 1513 is defined through a corresponding sidewall 151c and in communication with the receiving space 1510. Each accommodating hole 1513 is configured to receive a magnet 152. A joint of the outer surface between two neighboring sidewalls 151c is chamfered, forming a fourth chamfered surface 150.

The base 16 is made of plastic or resin and substantially cuboid. The base 16 includes a substantially square mounting surface 16a and two pair of assembling surfaces 16b perpendicularly connecting the mounting surface 16a. Each corner of four corners of the base 16 is chamfered, forming a fifth chamfered surface 160. The base 16 further includes four lower alignment poles 161 and four protrusions 162. The lower alignment poles 161 generally extend from the four corners of the mounting surface 16a. The four protrusions 162 extend from one pair of opposite assembling surfaces 16b. Each two protrusions 162 extend from one of the pair of opposite assembling surfaces 16b. Each of the protrusions 162 spatially corresponds to a mounting hole 105. A diameter of each protrusion 162 is slightly less than a diameter of a mounting hole 105.

Figure 4:
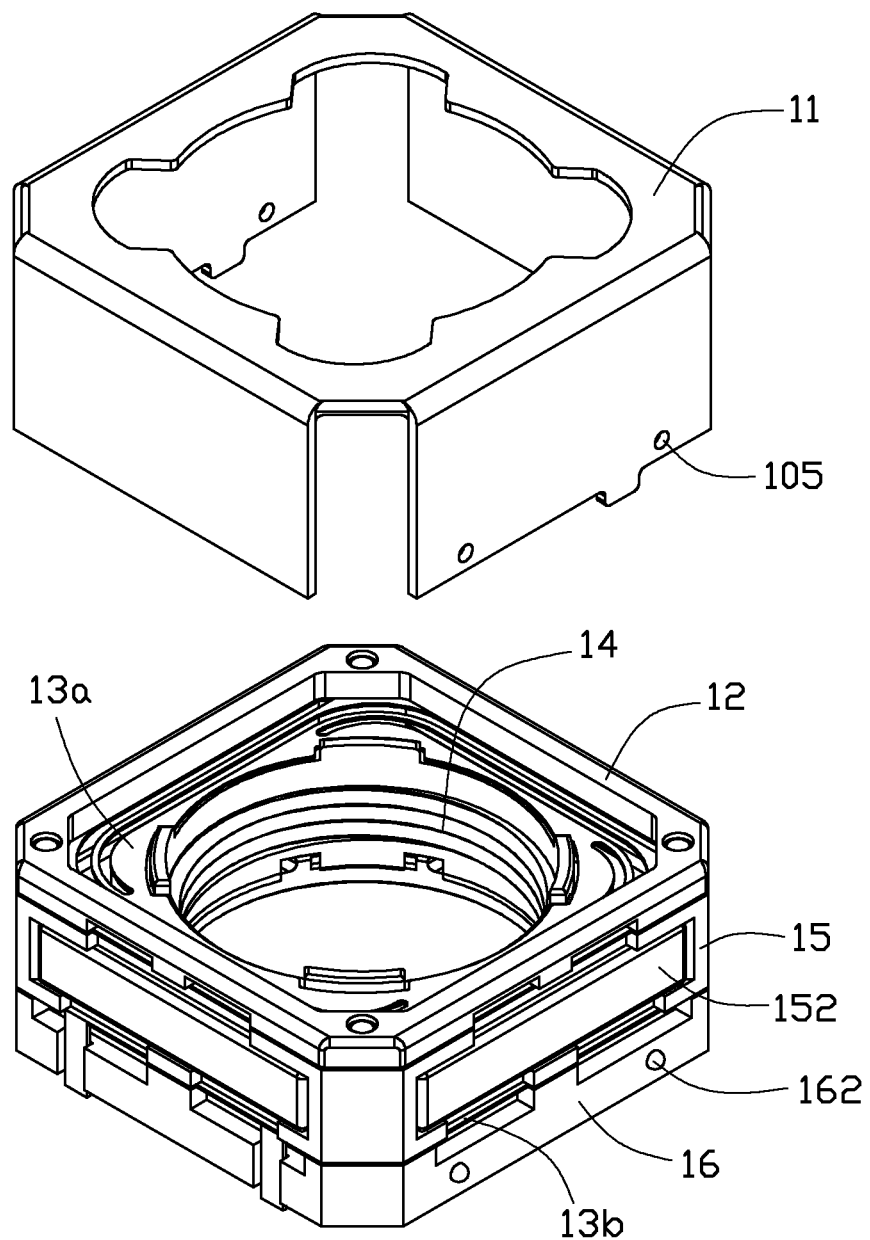
FIG. 4 is a partially assembled view of the voice coil motor of FIG. 2.

Referring to FIGS. 1, 2 and 4, in assembling, the lower elastic sheet 13b is mounted to the mounting surface 16a of the base 16 with each lower alignment pole 161 passing through a respective one of the first alignment holes 131 of the lower elastic sheet 13b. The moving unit 14 is seated on the lower elastic sheet 13b with one end of the lens retainer 141 being clamped in the light passing hole 130 of the lower elastic sheet 13b. Each of the magnets 152 is received in a respective one of the accommodating holes 1513. The rack 15 is seated on the lower elastic sheet 13b with the bottom surface 15b being attached on the lower elastic sheet 13b. Each lower alignment pole 161 is received in a respective one of the lower alignment holes 1512. The upper elastic sheet 13a is mounted to the other end of the lens retainer 141 away from the lower elastic sheet 13b. The other end of the lens retainer 141 away from the lower elastic sheet 13b is clamped in the light passing hole 130 of the upper elastic sheet 13a. Each of the upper alignment poles 1511 passes through a respective one of the first alignment holes 131 of the upper elastic sheet 13a.

The frame 12 is adhered to the upper elastic sheet 13a with each of the upper alignment holes 121 being aligned with a respective one of the first alignment holes 131 of the upper elastic sheet 13a. Each upper alignment pole 1511 is received in a respective one of the upper alignment holes 121. Each of the first chamfered surface 122, the second chamfered surface 133, the third chamfered surface 140, the four chamfered surface 150, and the fifth chamfered surface 160 is aligned with each other and is exposed outside of the shell 11 through a slot 104. The frame 12, the upper elastic sheet 13a, the lower elastic sheet 13b, the moving unit 14, the stator 15, and the base 16 are accommodated in the shell 11. The frame 12 is attached and is adhered to the top plate 101. Each of the protrusions 162 passes through a respective one of the mounting holes 105. Each of the protrusions 162 is heated to form a head portion 163 (see FIG. 1). An outer diameter of each of the head portions 163 is greater than the diameter of each of mounting holes 105. The head portion 163 can prevent each of the protrusions 162 from moving out of a corresponding mounting hole 105 such that to the base 16 is steadily connected to the shell 11.

In alternative embodiments, the frame 12 can be omitted to reduce the cost of the VCM 100.

In alternative embodiments, the number of slot 104 can be at least one rather than being limited to four. The base 16 may include protrusions 162 on at least one assembling surface 16b. The shell 11 defines mounting holes 105 on at least one side plate 102 spatially corresponding to the protrusions 162 on the at least one assembling surface 16b.

In alternative embodiments, the number of the protrusions 162 on each assembling surface 16b can be at least one rather than being limited to two. The number of the mounting holes 105 of each side plate 102 will be complied with the number of the protrusions 162 of each assembling surface 16b.

In alternative embodiments, the frame 12 does not define the first chamfered surfaces 122. The upper elastic sheet 13a and lower elastic sheet do not define the second chamfered surfaces 133. The lens retainer 141 does not define the third chamfered surfaces 140. The rack 151 does not define the four chamfered surfaces 150. The base 16 does not define the fifth chamfered surfaces 160.

The above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A voice coil motor (VCM), comprising:
a base made of plastic or resin, the base comprising a mounting surface, a plurality of assembling surfaces perpendicularly connecting the mounting surface, and at least one protrusion extending from at least one of the assembling surfaces, each protrusion comprising a head portion;
a stator comprising a rack and a plurality of magnets positioned on the rack, the rack being mounted to the mounting surface;
a moving unit movably received in the rack; and
a shell comprising a top plate and a plurality of side plates extending from the top plate, the shell defining at least one slot, each of the at least one slot being at a joint between each two adjacent side plates, at least one of the side plates defining at least one mounting holes, an outer diameter of each head portion greater than a diameter of each mounting hole;
wherein the base, the moving unit, and the stator are all accommodated in the shell, each protrusion passes through a respective one of the at least one mounting hole, each head portion is positioned outside of the shell and touches an outer surface of the shell.

2. The VCM of claim 1, wherein the VCM comprises an upper elastic sheet mounted to a top surface of the rack and a lower elastic sheet mounted to a bottom surface of the rack, the lower elastic sheet is attached to the mounting surface of the base, the moving unit comprises a lens retainer and coils wrapped around the lens retainer, two ends of the lens retainer are clamped by the upper elastic sheet and the lower elastic sheet.

3. The VCM of claim 2, wherein the base comprises a plurality of lower alignment poles extending from the mounting surface, the lower elastic sheet defines a plurality of first alignment holes, the rack defines a plurality of lower alignment holes on the bottom surface, each lower alignment pole passes through a respective one of the first alignment holes of the lower elastic and is received in a respective one of the lower alignment holes.

4. The VCM of claim 2, wherein the VCM comprises a frame being received in the shell and mounted on the upper elastic sheet and attached to the top plate.

5. The VCM of claim 4, wherein the upper elastic sheet defines a plurality of second alignment holes, the rack comprises a plurality of upper alignment poles extending from the top surface, the frame define a plurality of upper alignment holes, each upper alignment pole passes through a respective one of the second alignment holes of the upper elastic sheet and is received in a respective one of the upper alignment holes.

6. The VCM of claim 4, wherein the frame is substantially a square frame, each of four corners of the outer periphery of the frame is chamfered and forms a first chamfered surface; the upper elastic sheet and the lower elastic sheet are substantially rectangular, each of four corners of the outer periphery of each of the upper elastic sheet and the lower elastic sheet is chamfered and forms a second chamfered surface; each of four corners of the lens retainer is chamfered and forms a third chamfered surface; the rack is substantially cuboid and comprises four sidewalls, a joint of the outer surface between each two adjacent sidewalls is chamfered and forms a fourth chamfered surface; the base is substantially cuboid, each of four corners of the base is chamfered and forms a fifth chamfered surface; each of the first, second, third, four, and fifth chamfered surfaces is aligned with each other.

7. The VCM of claim 1, wherein the top plate is substantially square, the shell comprises two pairs of side plates, each of the side plates perpendicularly extends from a corresponding side of the top plate, the number of the at least one mounting hole is four, each side plate in one pair of side plates defines two of the mounting holes away from the top plate; the number of the at least one protrusion is four.

8. The VCM of claim 7, wherein the base is substantially cuboid and comprises two pair of assembling surfaces, the four protrusions extend from one pair of the assembling surfaces, each two of the protrusions extend from a respective one assembling surface.

9. The VCM of claim 7, wherein the shell defines four of the slots.

10. A VCM, comprising:
a shell comprising a top plate and a plurality of side plates extending from the top plate, the shell defining at least one slot, each of the at least one slot at a joint between two neighboring side plates, at least one of the side plates defining at least one mounting hole;
a base made of plastic or resin, the base received in the shell, the base comprising a mounting surface, a plurality of assembling surfaces perpendicular to the mounting surface, and at least one protrusion extending from at least one of the assembling surfaces, each protrusion passing through a respective one of the at least one mounting hole;
a stator received in the shell and comprising a rack and a plurality of magnets positioned on the rack, the rack being mounted to the mounting surface; and
a moving unit movably received in the rack;
wherein each protrusion comprises a head portion, an outer diameter of each head portion is greater than a diameter of each mounting hole, each head portion is positioned outside the shell to prevent each protrusion from moving out each mounting hole.

11. The VCM of claim 10, wherein the VCM comprises an upper elastic sheet mounted to a top surface of the rack and a lower elastic sheet mounted to a bottom surface of the rack and attached to the mounting surface of the base, the moving unit comprises a lens retainer and coils wrapped around the lens retainer, two ends the lens retainer are clamped by the upper elastic sheet and the lower elastic sheet.

12. The VCM of claim 11, wherein the VCM comprises a frame being received in the shell and mounted on the upper elastic sheet and attached to the top plate.

* * * * *